(12) United States Patent
Cerka et al.

(10) Patent No.: US 10,447,018 B2
(45) Date of Patent: Oct. 15, 2019

(54) TERMINAL BOX APPARATUS WITH SIDE WALL ENTRANCE AND CURVED WIRING GUIDE

(71) Applicant: FISHER CONTROLS INTERNATIONAL, LLC, Marshalltown, IA (US)

(72) Inventors: Benjamin August Cerka, Colo, IA (US); Christopher Metschke, Ames, IA (US); Roger Lynn Heatwole, Marshalltown, IA (US); Brendan Piscitelli, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/599,982

(22) Filed: May 19, 2017

(65) Prior Publication Data

US 2018/0337521 A1 Nov. 22, 2018

(51) Int. Cl.
*H02G 3/08* (2006.01)
*H02G 3/14* (2006.01)
*H02G 3/16* (2006.01)

(52) U.S. Cl.
CPC ............. *H02G 3/083* (2013.01); *H02G 3/08* (2013.01); *H02G 3/14* (2013.01); *H02G 3/16* (2013.01)

(58) Field of Classification Search
CPC ................. H02G 3/083; H02G 3/08; H02G 3/14; H02G 3/16
USPC ................................ 174/50, 66, 67
See application file for complete search history.

(56) References Cited

U.S. PATENT DOCUMENTS

| | | | | |
|---|---|---|---|---|
| 2,515,724 A | * | 7/1950 | McCroskey | H02G 1/08 174/650 |
| 2,699,533 A | | 1/1955 | Harnett | |
| 2,774,382 A | * | 12/1956 | Bentley | F16C 1/26 138/138 |
| 4,819,842 A | * | 4/1989 | Westervelt | B05C 9/12 156/273.3 |

(Continued)

FOREIGN PATENT DOCUMENTS

| | | |
|---|---|---|
| DE | 102013109653 | 3/2015 |
| EP | 2278674 | 1/2011 |

(Continued)

OTHER PUBLICATIONS

Fisher Controls International LLC., "Fisher™ FIELDVUE™ DVC6200f Digital Valve Controller," Product Bulletin, D103399X012, Feb. 2017, 4 pages.

(Continued)

*Primary Examiner* — Dhiru R Patel
(74) *Attorney, Agent, or Firm* — Hanley, Flight & Zimmerman, LLC

(57) ABSTRACT

A terminal box including a housing having a base, a side wall extending from the base, and a first opening opposite the base to provide access to wiring terminals to be mounted adjacent an inner surface of the side wall. The terminal box further includes a second opening in the side wall, the second opening providing access to a curved wiring guide within the housing. The curved wiring guide is shaped to guide electrical wires away from the base and toward a central portion of the first opening.

20 Claims, 5 Drawing Sheets

(56) References Cited

U.S. PATENT DOCUMENTS

| | | | |
|---|---|---|---|
| 5,052,950 A * | 10/1991 | Wilson | G01K 7/023 |
| | | | 174/59 |
| 5,266,057 A | 11/1993 | Angel, Jr. et al. | |
| 7,279,633 B2 | 10/2007 | Waters | |
| 7,614,922 B1 | 11/2009 | Buse | |
| 7,696,435 B1 * | 4/2010 | Thomas | H02G 3/0481 |
| | | | 138/118 |
| 9,466,962 B1 * | 10/2016 | Gretz | H02G 3/20 |
| 2009/0025975 A1 | 1/2009 | Young et al. | |
| 2009/0194323 A1 | 8/2009 | Jolly | |
| 2010/0122826 A1 | 5/2010 | de la Borbolla | |
| 2013/0213706 A1 | 8/2013 | Rosen et al. | |

FOREIGN PATENT DOCUMENTS

| | | |
|---|---|---|
| EP | 2525459 | 11/2012 |
| EP | 2716829 | 4/2014 |

OTHER PUBLICATIONS

International Searching Authority, "International Search Report," issued in connection with International Patent Application PCT/US2018/030566, dated Jul. 19, 2018, 6 pages.

International Searching Authority, "Written Opinion," issued in connection with International Patent Application PCT/US2018/030566, dated Jul. 19, 2018, 7 pages.

United States Patent and Trademark Office, "Non-final Office Action," issued in connection with the U.S. Appl. No. 15/599,992, dated Dec. 15, 2017, 20 pages.

United States Patent and Trademark Office, "Final Office Action," issued in connection with the U.S. Appl. No. 15/599,992, dated Apr. 9, 2018, 19 pages.

United States Patent and Trademark Office, "Advisory Action," issued in connection with the U.S. Appl. No. 15/599,992, dated Jun. 21, 2018, 4 pages.

* cited by examiner

TERMINAL BOX APPARATUS WITH SIDE WALL ENTRANCE AND CURVED WIRING GUIDE

FIELD OF THE DISCLOSURE

This disclosure relates generally to electrical connection apparatus and, more particularly, to terminal box apparatus with side wall entrance and a curved wiring guide.

BACKGROUND

Process control systems typically require a large amount of wiring to transfer information and provide electrical power. The field devices used in process control systems often require multiple wires to terminate at a single location. Terminal boxes generally have a housing including a base and a removable cover to access wiring terminals within the terminal box, as well as an entryway to allow wires into the housing. The wiring terminals are usually positioned toward the top of the terminal box and the entryway resides on the side wall of the housing. As a result, the wires enter a side wall of the housing, bend at approximately a right angle, and travel upward toward the wiring terminals.

SUMMARY

An example terminal box disclosed herein includes a housing having a base, a side wall extending from the base, and a first opening opposite the base to provide access to wiring terminals to be mounted adjacent an inner surface of the side wall. The terminal box further includes a second opening in the side wall, the second opening providing access to a curved wiring guide within the housing, the curved wiring guide shaped to guide electrical wires away from the base and toward a central portion of the first opening.

Another example terminal box disclosed herein includes a housing having a base, a wall extending from the base, and a first opening in the wall. The first opening provides access to a curved wiring guide within the housing, the curved wiring guide shaped to guide electrical wires away from the base.

Yet another example terminal box disclosed herein includes a curved wiring guide including two openings at opposite ends of the curved wiring guide. The two openings have respective central axes that are approximately perpendicular. The terminal box further includes at least one mount on an outer surface of the curved wiring guide to couple to a terminal block, the terminal block including wiring terminals, the wiring terminals to make electrical connections with wires traveling through the curved wiring guide.

Figure 1:
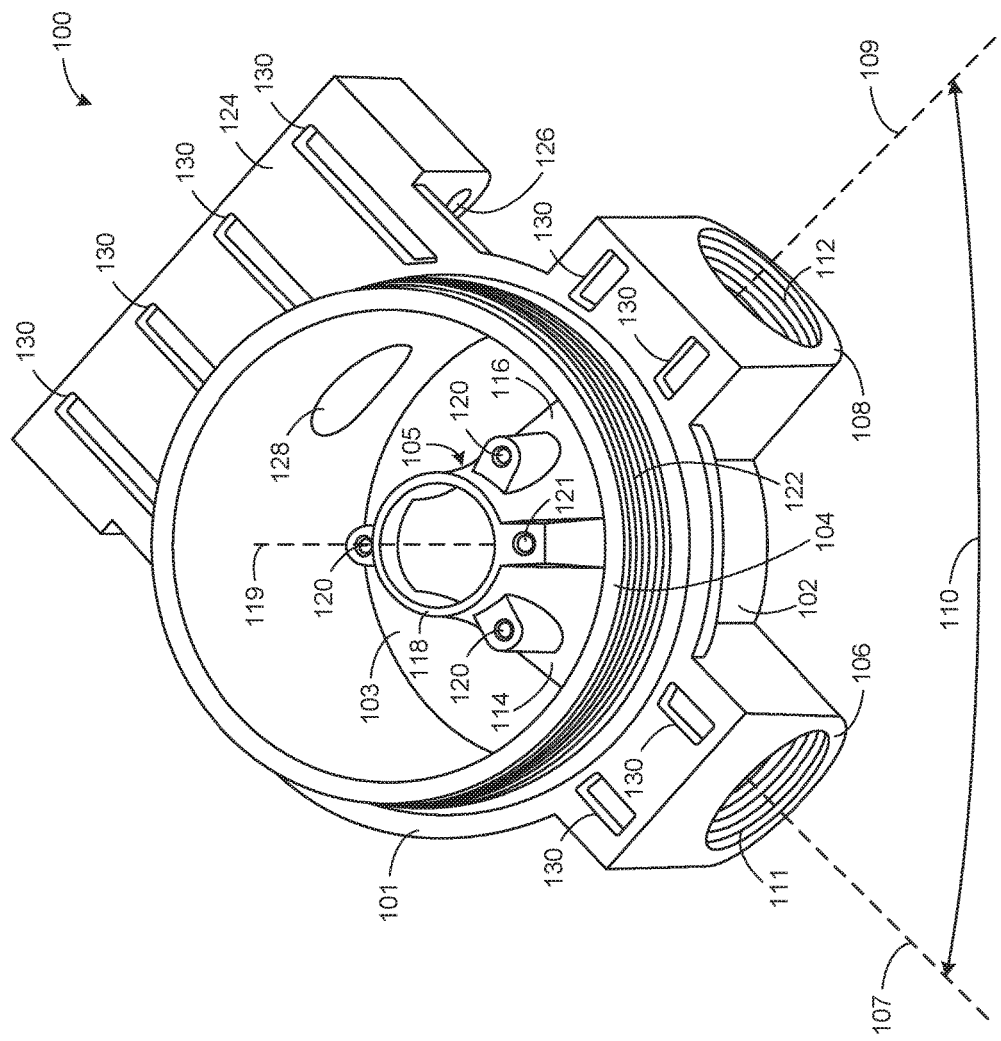
FIG. 1 illustrates an example terminal box with two example side wall entrances in accordance with the present disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in contact with another part means that there is no intermediate part between the two parts.

DETAILED DESCRIPTION

Terminal boxes are commonly used in process control systems to distribute power and other signals to various field devices via wires and wiring terminals within the terminal boxes. In some examples, field devices require multiple wires to terminate or connect at a single location. In such examples, terminal boxes may be used to house these connections. Known terminal boxes typically have a housing with an entryway or opening through a side wall into the terminal box. The wiring terminals are typically adjacent an opening toward the top of the terminal box. These known designs typically require wires to enter the terminal box horizontally through the side wall, bend at approximately a right angle, and travel vertically up toward the wiring terminals. This may cause a sharp bend in the wires, which may cause a loss of connection, frayed wires, or difficulty routing the wires through the terminal box.

Example terminal boxes disclosed herein provide an entryway or opening on the exterior side wall of the housing leading into a curved wiring guide. The shape of the wiring guide allows the wires to reach the wiring terminals with significantly less bending than the above-noted known designs.

In an example terminal box disclosed herein, the housing includes a base, a peripheral side wall extending from the base, and a first opening opposite the base to provide access to wiring terminals. The housing further includes a second opening in the side wall that provides access to a curved wiring guide within the housing. The curved wiring guide is shaped to guide electrical wires away from the base and toward a central portion of the first opening. The first opening and the second opening have central axes that are approximately perpendicular.

In an additional example terminal box described herein, the housing includes a base, an outer side wall extending from the base, and a first opening opposite the base to provide access to wiring terminals. The housing further includes second and third openings through the side wall that may or may not be spaced evenly or in another manner around the side wall. For example, the second and third openings through the housing of a terminal box may be positioned 180 degrees from one another, 90 degrees from one another, etc. The second and third openings provide access to a curved wiring guide within the housing. The curved wiring guide is shaped to guide electrical wires away from the base and toward a central portion of the first opening. In some examples, a terminal box housing may include more than two entryways or openings through the side wall.

FIG. 1 illustrates an example terminal box 100 including a housing 101 that includes a peripheral side wall 102, a base 103 and a first opening 104 opposite the base 103. The first opening 104 provides access to a curved wiring guide 105 that is shaped to guide wires toward a central portion of the first opening 104. The housing 101 further includes a second opening 106 through the side wall 102 that has a central axis 107 and a third opening 108 through the side wall 102 that has a central axis 109. In this example terminal box, an angle 110 between the central axes 107 and 109 is approximately ninety degrees. However, in other examples, the angle 110 may be wider or narrower. Further, in the illustrated example, the terminal box 100 has two openings through the side wall 102. However, in other examples, the number of openings may be greater or fewer.

The second and third openings 106 and 108 include respective threads 111 and 112, to receive conduit connections. The second and third openings 106 and 108 lead into the curved wiring guide 105. In the illustrated example, the curved wiring guide 105 includes two curved passageways, 114 and 116. As more clearly depicted in FIGS. 2-4, the example curved passageways 114 and 116, are elbow shaped. The curvature of the passageways 114 and 116 allows the wires to reach the wiring terminals 202 (shown in FIG. 2) without excessive bending. The passageways 114 and 116, lead to an interior opening 118. As shown, the second and third openings 106 and 108 and the interior opening 118 are at opposite ends of the curved wiring guide 105. In the illustrated example, the curved passageways 114 and 116 are positioned such that the second opening 106 and the interior opening 118 at an end of the curved passageway 114 adjacent the first opening 104 each have respective central axes, 107 and 119 that are approximately perpendicular. Similarly, the interior opening 118 and the third opening 108 have respective central axes, 119 and 109 that are approximately perpendicular. Further, while the illustrated example terminal box 100 includes two curved passageways, in other examples, the number of curved passageways may be greater or fewer.

Adjacent to the interior opening 118 are three mounts 120 on the outer surface of the curved wiring guide 105 to receive a terminal block 206 (shown in FIG. 2) containing wiring terminals. A fourth mount 121 resides on the outer surface of the curved wiring guide 105 to receive a ground wiring terminal. To house the three mounts 120, the fourth mount 121, and the terminal block, the outer surface of the housing 101 adjacent the first opening 104 includes threads 122 to receive a threaded cover.

The housing 101 further includes a mounting boss 124 with holes 126 to allow the terminal box 100 to be mounted to electrical equipment, a field device, etc. In the illustrated example, a fourth opening 128 through the side wall 102 provides a passageway that may be used to provide access to a circuit board 208 (shown in FIG. 2). The mounting boss 124 and the openings 106 and 108 include multiple recesses 130 to secure the threaded cover to the housing 101, prevent loosening of the cover, and satisfy explosion-proof requirements.

Figure 2:
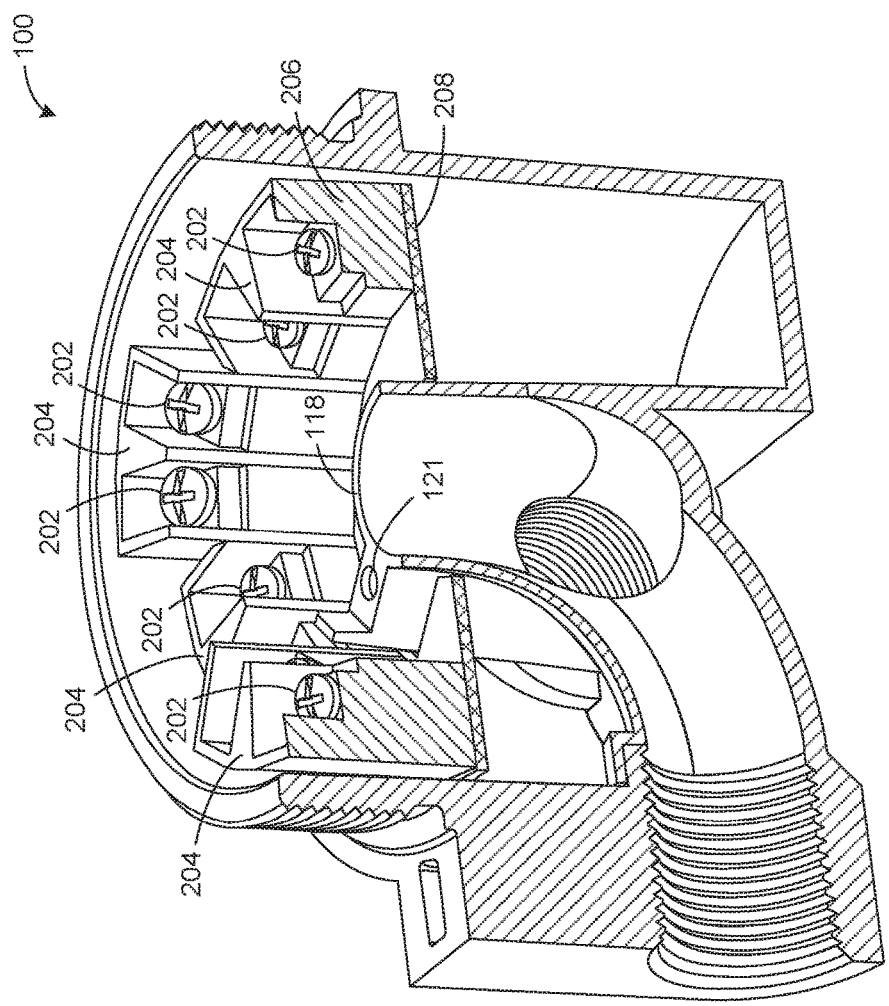
FIG. 2 illustrates a cross-sectional view of the example terminal box of FIG. 1.

FIG. 2 illustrates a cross-sectional view of the example terminal box 100 including wiring terminals 202 coupled to compartments 204 that are attached to a terminal block 206. The compartments 204 and the terminal block 206 serve as a place to hold the wiring terminals 202. FIG. 2 further illustrates a circuit board 208 supporting the terminal block 206. The circuit board 208 may be attached to the terminal box 100 via the mounts 120 (shown in FIG. 1). For example, fasteners may pass through the circuit board 208 into the mounts 120. The wiring terminals 202 in the example terminal box 100 are screw terminals. However, in other examples, the wiring terminals 202 may be any type of terminal connection (e.g., clip, tongue, crimp, tab, etc.). FIG. 2 also clearly shows the fourth mount 121 to accept a ground wiring terminal adjacent the interior opening 118. The fourth mount 121 may be electrically connected to the circuit board 208 and/or the housing 101 of the terminal box 100.

Figure 3:
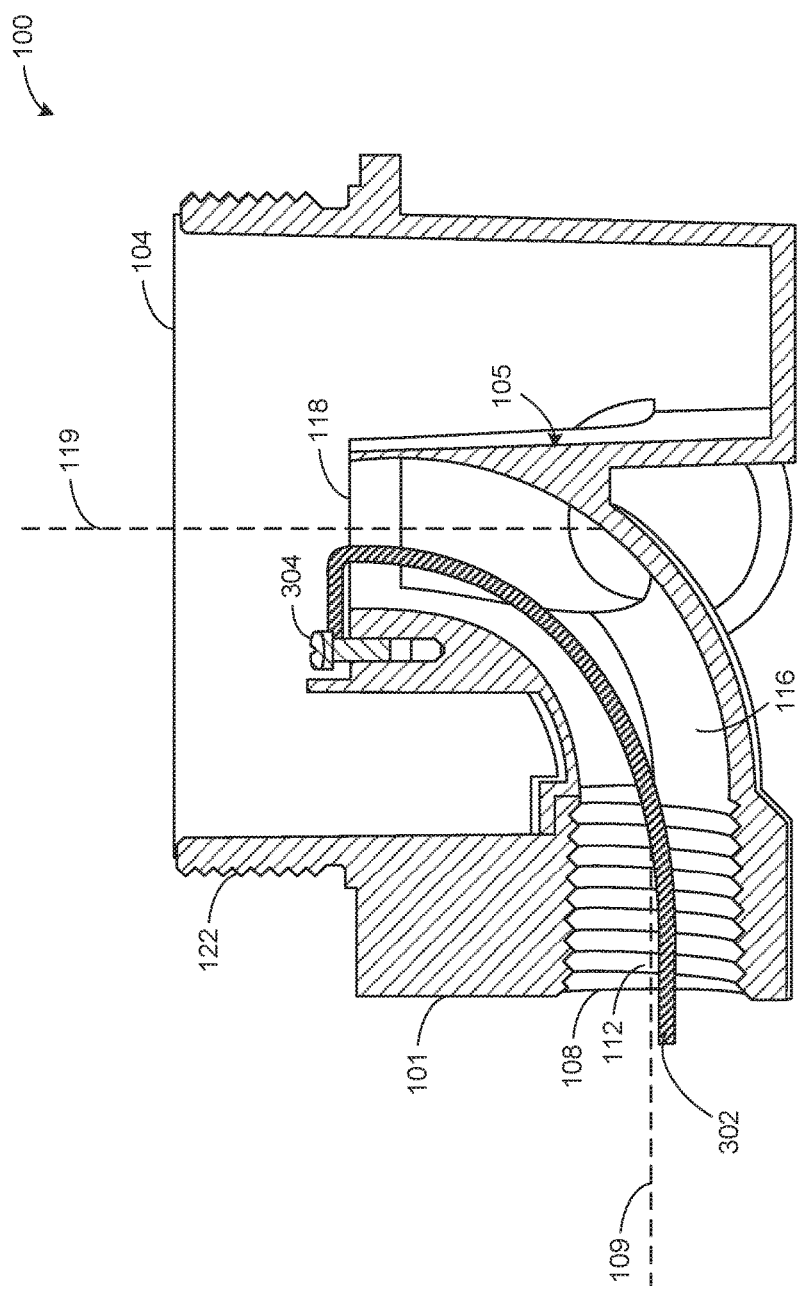
FIG. 3 illustrates another cross-sectional view of the example terminal box of FIGS. 1 and 2.

FIG. 3 illustrates another cross-sectional view of the example terminal box 100 without the terminal block 206. FIG. 3 clearly illustrates the shape of the curved passageway 116 within the curved wiring guide 105. The example curved wiring guide 105 may be attached to the housing 101 after the manufacture of both parts, or the curved wiring guide 105 may be integrally molded within the housing 101. Additionally. FIG. 3 shows a ground wire 302 traveling through the curved wiring guide 105 and through the interior opening 118. The ground wire 302 connects to the ground wiring terminal 304 mounted on an outer surface of the curved wiring guide 105 adjacent the interior opening 118. In the illustrated example, the ground wiring terminal 304 is attached to an outer surface of the curved wiring guide 105. However, in other examples, the ground wiring terminal 304 may be coupled to the inner surface of the housing 101 or any other place on the terminal box. FIG. 3 further illustrates the threads 112 on the inner surface of the third opening 108. The threads 112 allow the wiring guide 105 to receive a conduit connection. This view of the example terminal box 100 also illustrates the threads 122 adjacent the first opening 104. These threads 122 allow the terminal box 100 to receive a threaded cover.

Figure 4:
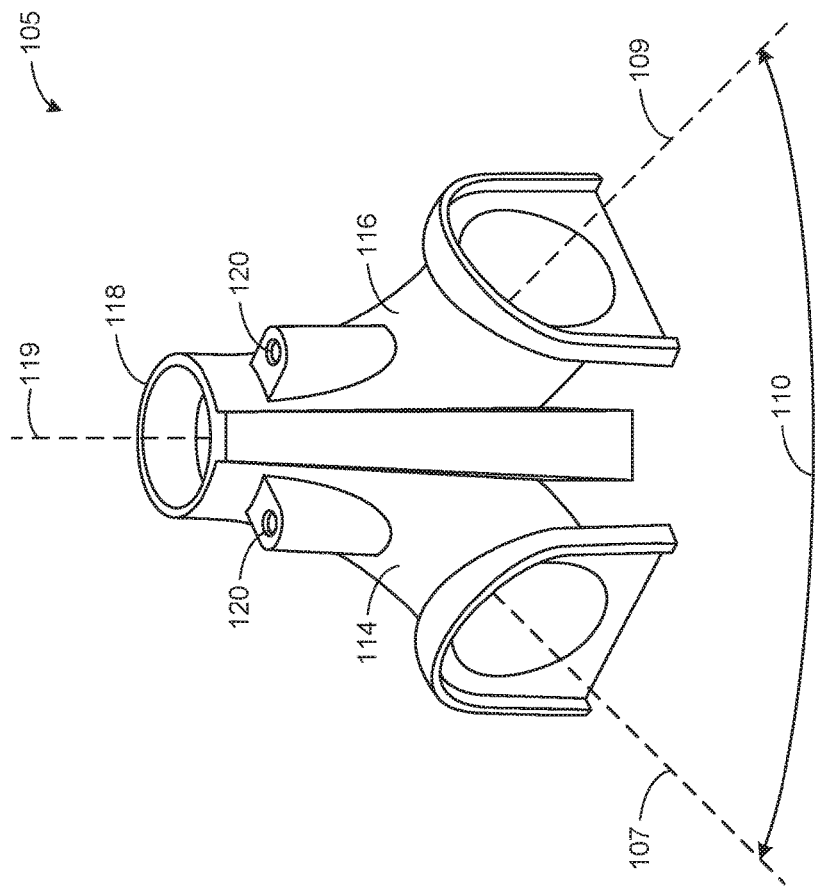
FIG. 4 illustrates the example wiring guide used within the terminal box of FIGS. 1-3.

FIG. 4 illustrates the example curved wiring guide 105 that may be used within the example terminal box 100. As shown, the central axis 119 is approximately perpendicular to both central axes 107 and 109. FIG. 4 also shows two of the mounts 120 to couple to a terminal block on the outer surface of the wiring guide 105. Although the example wiring guide 105 includes three mounts 120 to couple to a terminal block, in other examples, the number of mounts 120 may be greater or fewer.

Figure 5:
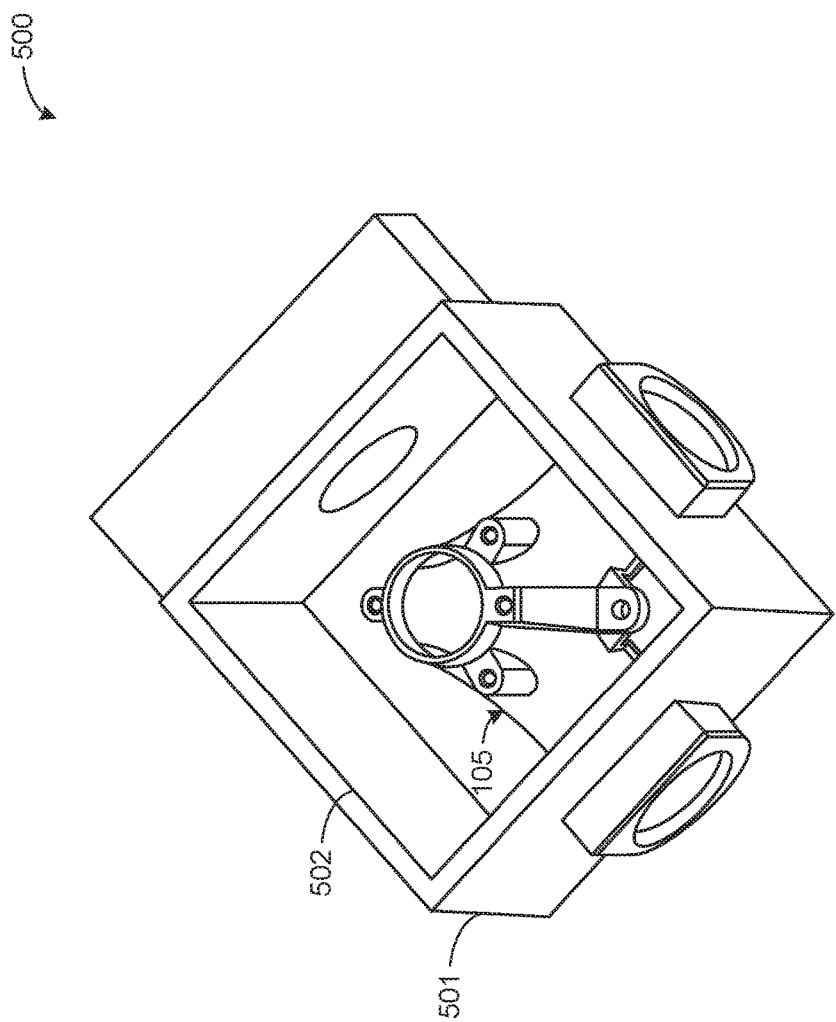
FIG. 5 illustrates another example terminal box with a rectangularly shaped housing.

FIG. 5 illustrates another example terminal box 500. The terminal box 500 has a rectangularly shaped housing 501 and an opening 502 to provide access to the wiring guide 105. The example terminal boxes 100 and 500 disclosed herein have respective housings 101 and 501 that are cylindrically and rectangularly shaped. However, in other examples, a terminal box may include a housing having a different shape.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A terminal box comprising:
  a housing having a base, a side wall extending from the base, and a first opening opposite the base to provide access to wiring terminals to be mounted adjacent an inner surface of the side wall; and
  a second opening in the side wall, the second opening providing access to a passageway to guide electrical wires within the housing, the passageway curved along a length of the passageway to guide terminating ends of the electrical wires away from the base and toward a central portion of the first opening to reach the wiring terminals.

2. The terminal box of claim 1, wherein the passageway is elbow shaped.

3. The terminal box of claim 1, wherein the second opening and an interior opening at an end of the passageway adjacent the first opening have central axes that are approximately perpendicular.

4. The terminal box of claim 1, wherein the second opening is threaded to receive a conduit connection.

5. The terminal box of claim 1, wherein an outer surface of the housing adjacent the first opening is threaded.

6. The terminal box of claim 1 further including a terminal block, the terminal block including at least one of the wiring terminals to make an electrical connection with at least one electrical wire.

7. The terminal box of claim 6, wherein the terminal block is coupled to the housing via a circuit board.

8. The terminal box of claim 1, wherein the housing has a cylindrical shape.

9. A terminal box comprising:
  a housing having a base, a wall extending from the base; and
  a first opening in the wall, the first opening providing access to a passageway to guide electrical wires within the housing toward wiring terminals, the passageway curved along a length of the passageway to guide terminating ends of the electrical wires away from the base and toward the wiring terminals.

10. The terminal box of claim 9 further comprising a terminal block, the terminal block including at least one wiring terminal.

11. The terminal box of claim 10, further including a mount disposed on an outer surface of the passageway to couple to the terminal block.

12. The terminal box of claim 9, wherein the passageway is to guide the electrical wires toward a second opening opposite the base.

13. The terminal box of claim 12, wherein the first opening and a third opening at an end of the passageway adjacent the second opening are at opposite ends of the passageway.

14. The terminal box of claim 9 further comprising a ground wiring terminal.

15. The terminal box of claim 14, wherein the ground wiring terminal is mounted on an outer surface of the passageway.

16. A terminal box comprising:
  a passageway to guide wires including two openings at opposite ends of the passageway, the passageway curved along a length of the passageway between the two openings, the two openings having respective central axes that are approximately perpendicular; and
  at least one mount on an outer surface of the passageway to couple to a terminal block, the terminal block including wiring terminals, the wiring terminals to make electrical connections with wires traveling through the passageway.

17. The terminal box of claim 16, wherein the passageway is integrally molded with the terminal box.

18. The terminal box of claim 16 further comprising a base and a side wall, the side wall including an opening to provide access into the terminal box and the passageway.

19. The terminal box of claim 16, wherein the terminal block is coupled to a circuit board.

20. The terminal box of claim 16 further comprising a ground wiring terminal, the ground wiring terminal to make a connection with a ground wire traveling through the passageway.

* * * * *